United States Patent [19]

Albaric et al.

[11] 3,968,389

[45] July 6, 1976

[54] DYNAMOELECTRIC MACHINE WITH WATER-COOLED ROTOR

[75] Inventors: Jacques E. Albaric, Pittsburgh, Pa.; James E. Adamson, Plantation, Fla.

[73] Assignee: Westinghouse Electric Corporation, Pittsburgh, Pa.

[22] Filed: June 13, 1974

[21] Appl. No.: 479,070

[52] U.S. Cl. .................................................. 310/61
[51] Int. Cl.² ......................................... H02K 1/32
[58] Field of Search .................. 310/52, 57, 53, 58, 310/54, 59, 55, 60, 56, 61, 64, 65, 68, 68 D, 261

[56] References Cited
UNITED STATES PATENTS

| | | | |
|---|---|---|---|
| 3,145,314 | 8/1964 | Becker | 310/61 |
| 3,359,438 | 12/1967 | Hylen | 310/52 |
| 3,363,122 | 1/1968 | Hoover | 310/52 |
| 3,457,440 | 7/1969 | Horsley | 310/52 |
| 3,517,231 | 6/1970 | Massar | 310/52 |
| 3,733,502 | 5/1973 | Curtis | 310/61 |
| 3,740,595 | 6/1973 | Heller | 310/64 |
| 3,818,256 | 6/1974 | Ying | 310/64 |

*Primary Examiner*—R. Skudy
*Attorney, Agent, or Firm*—G. H. Telfer

[57] ABSTRACT

In a large turbine generator unit having a liquid-cooled rotor, the liquid coolant is introduced into the rotor through the central bores of the exciter shaft and the generator shaft. This requires coolant tubes and electrical conductors for the field excitation current to be placed in the bores of the shafts, and requires joints between the coolant tubes and connections between the electrical conductors at the junction of the shafts in addition to a mechanical coupling for making a driving connection between the shafts. The invention provides means for making the necessary coolant tube joints and electrical connections within the mechanical coupling after the exciter and generator shafts have been aligned and are in the final coupling position.

7 Claims, 9 Drawing Figures

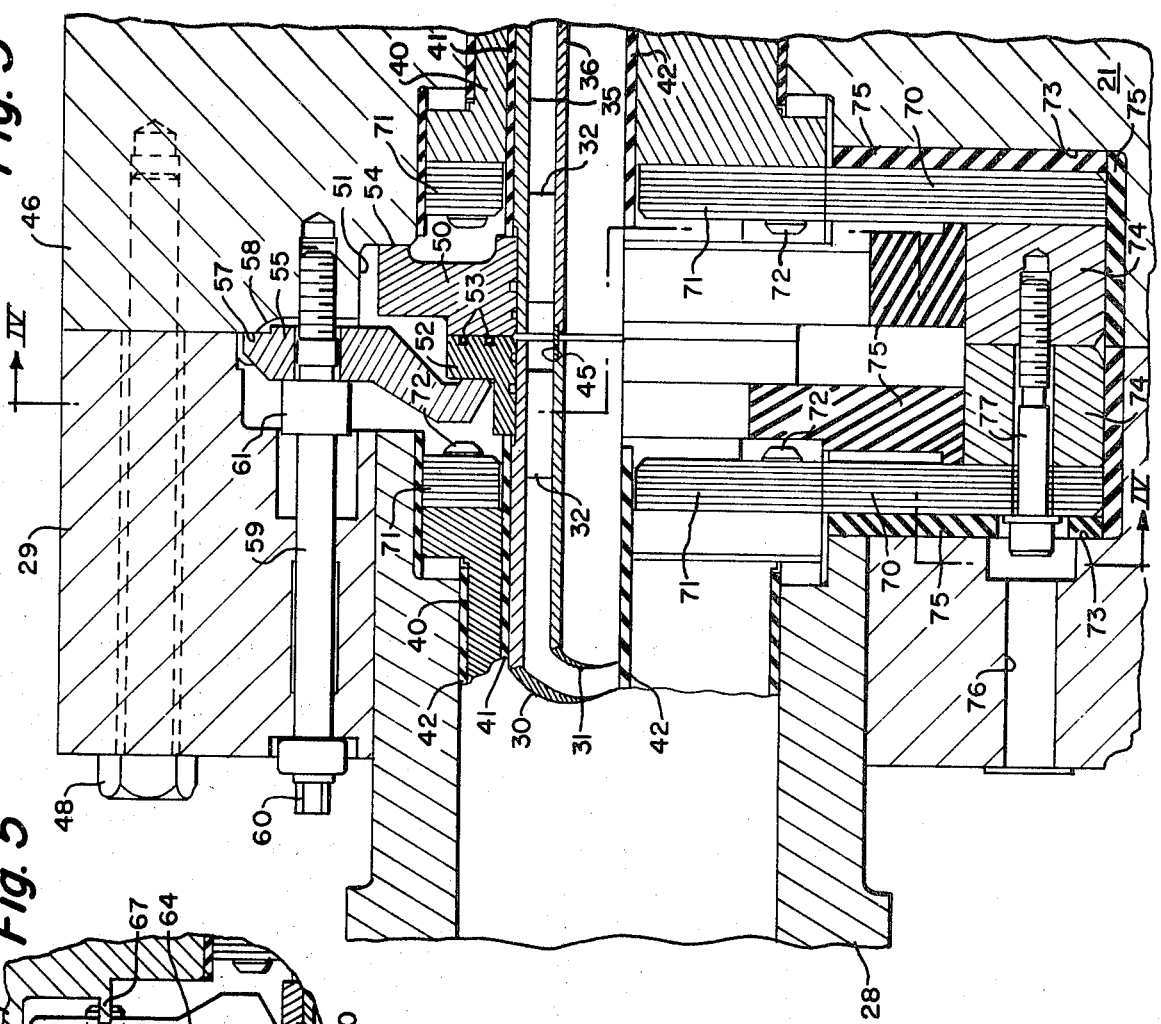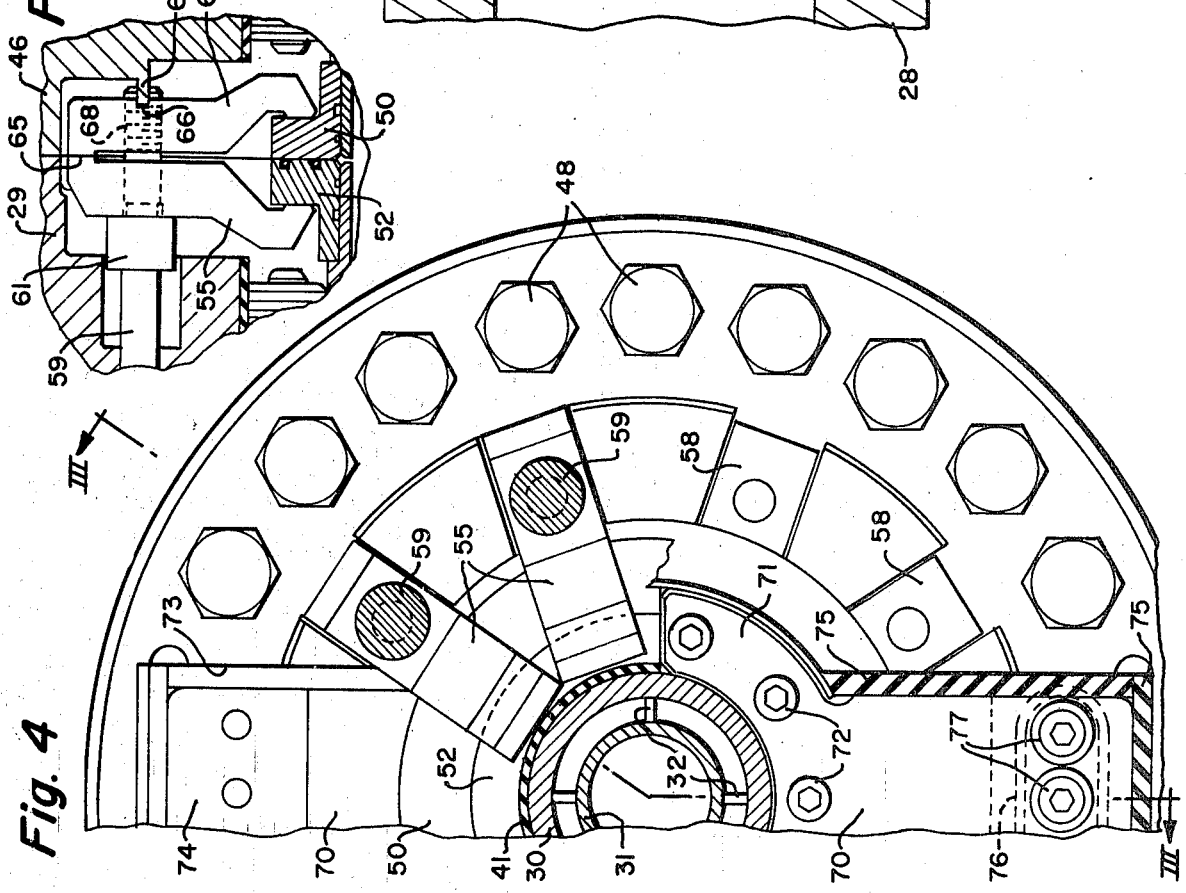

DYNAMOELECTRIC MACHINE WITH WATER-COOLED ROTOR

BACKGROUND OF THE INVENTION

The present invention relates to dynamoelectric machines such as large turbine generators, and more particularly to the supply of liquid coolant to liquid-cooled rotors in such machines.

Large turbine generator units are usually of the inner cooled, or direct cooled, construction in which a coolant fluid is circulated through duct means in the stator and rotor slots in direct thermal relation with the current-carrying conductors inside the ground insulation. This type of construction provides a very effective cooling system which has made it possible to attain very high ratings for large generators. The coolant fluid used in these machines heretofore has been hydrogen which fills the gas-tight housing and is circulated through the ducts of the stator and rotor windings and through radial or axial ducts in the stator core. Further improvements in cooling have more recently become necessary to still further increase the maximum capacities of these large generators, and can be obtained by the use of more efficient coolant fluids such as liquids.

This can be done by circulating a liquid coolant, such as water, through the ducts of the stator winding, and a substantial further improvement can be obtained by circulating a liquid coolant through passages in the rotor winding. Many problems are involved, however, in circulating a liquid through the rotor of a large generator. One of the most difficult problems is that of introducing the liquid into and discharging it from a rotor of large diameter rotating at high speed, usually 3600 revolutions per minute, and with a relatively large volume of liquid under the substantial pressure necessary to obtain the required flow of liquid through the passages of the rotor winding. The high added pressures which occur in fluid passages near the periphery of the rotor during operation because of the centrifugal force make it desirable to introduce the liquid on the axis of the shaft where the centrifugal force is a minimum. Since the axis is normally accessible only at the exciter end of the machine, it has been proposed to introduce the coolant liquid through the exciter shaft, as in Curtis et al U.S. Pat. No. 3,733,502 and as also suggested in patents to Becker U.S. Pat. No. 3,145,314 and Horsley U.S. Pat. No. 3,457,440.

The cooling liquid is thus introduced, and preferably also discharged, through a coolant tube or tubes extending through the central bore of the exciter shaft and through the central bore of the generator shaft. These shaft bores are also used for the heavy electrical conductors which carry the excitation current from the exciter to the generator rotor winding. This arrangement, therefore, involves the problem of carrying both the flow of coolant liquid and the electrical excitation current through or past the mechanical coupling between the exciter and generator shafts. A liquid-tight joint must be made between corresponding tubes in the exciter and generator shafts, and electrical connections must be made between the corresponding conductors in the exciter and generator shafts. In addition, a mechanical coupling must be provided to join the exciter and generator shafts with a mechanical driving connection.

It would, of course, be possible to make the joint between the coolant tubes while the exciter shaft itself is spaced at least several inches away from the end of the generator shaft. The tubes would be accessible and the joint between them could easily be made. The electrical connections could then be made between corresponding conductors by suitable flexible connectors, and the entire exciter shaft and rotor moved axially along the coolant tube until the exciter shaft abutted the generator shaft. The mechanical coupling could then be made. Such a procedure obviously has numerous disadvantages. The support for the coolant tube in the exciter shaft bore would have to be such as to permit relative axial movement of at least several inches at each assembly or disassembly of the machine. The exciter bearing would have to be designed to permit this large axial movement of the shaft, and the arrangement would have to insure very accurate axial movement so as not to damage the tubes and not to affect the accurate alignment of the exciter shaft and the generator shaft. Obviously, these requirements would be very difficult to meet. The coolant tube joint and the electrical connections should, therefore, be made with the rotors and shafts of the exciter and generator in their final coupling position so that no further appreciable relative movement between the tubes and shafts is required. This can, of course, be done either before or after the mechanical coupling of the shafts is completed.

The coolant tube joints and electrical connections may be made in the manner disclosed in a copending application of F. P. Fidei et al, Ser. No. 444,582, filed Feb. 21, 1974 and assigned to Assignee of the present invention. As there disclosed, the exciter coupling member is made axially movable on the exciter shaft so it can be retracted sufficiently to permit access to the coolant tubes for making the joint, after which the electrical connections can be completed and the exciter coupling member moved to its final position and the mechanical coupling completed. This represents a satisfactory solution of the problem but in many cases it may not be desirable to require movement of the coupling member, and it is often preferable to provide for making the necessary joints and connections from the exterior of the coupling member without requiring it to be moved, or after the coupling is completed.

SUMMARY OF THE INVENTION

A large generating unit is provided including a generator and exciter. The generator has a liquid-cooled rotor with the liquid introduced into the rotor, and preferably also discharged therefrom, through the central bores of the exciter shaft and the generator shaft. The necessary electrical conductors are also disposed in the shaft bores.

In accordance with the invention, means are provided for making liquid-tight joints between the coolant tubes of the exciter and generator shafts, and for making the electrical connections between corresponding conductors in the respective shafts, all within the mechanical coupling which joins the two shafts and with the shafts and coupling in their final positions. For this purpose, the tubes terminate in abutting radial flanges with sealing means between them, and clamping means external to the flanges are provided within the coupling to clamp the flanges together with sufficient axial force to form a liquid-tight seal. The coupling provides means for access to the clamping means without moving the coupling member itself, so that the clamping means are accessible for actuation from outside the coupling and the liquid-tight joint can thus be made without disturbing the position of the shafts or of the coupling. Access openings are also provided in the coupling for completing the electrical connections between conductors from outside the coupling. In this way, the exciter shaft and rotor can be moved to the final coupling position and accurately aligned with the generator shaft, and the necessary joints and electrical connections can then be made either before or after final completion of the mechanical coupling but without disturbing the position of the shafts or of the coupling member itself.

BRIEF DESCRIPTION OF THE DRAWINGS

The invention will be more fully understood from the following detailed description, taken in connection with the accompanying drawings, in which:

FIG. 3 is an enlarged longitudinal sectional view of a coupling assembly embodying the invention, substantially on the line III—III of FIG. 4;

FIG. 4 is a transverse sectional view of the coupling assembly substantially on the line IV—IV of FIG. 3;

FIG. 5 is a fragmentary longitudinal sectional view illustrating a modification of the structure of FIG. 3;

DESCRIPTION OF THE PREFERRED EMBODIMENT

Figure 1:
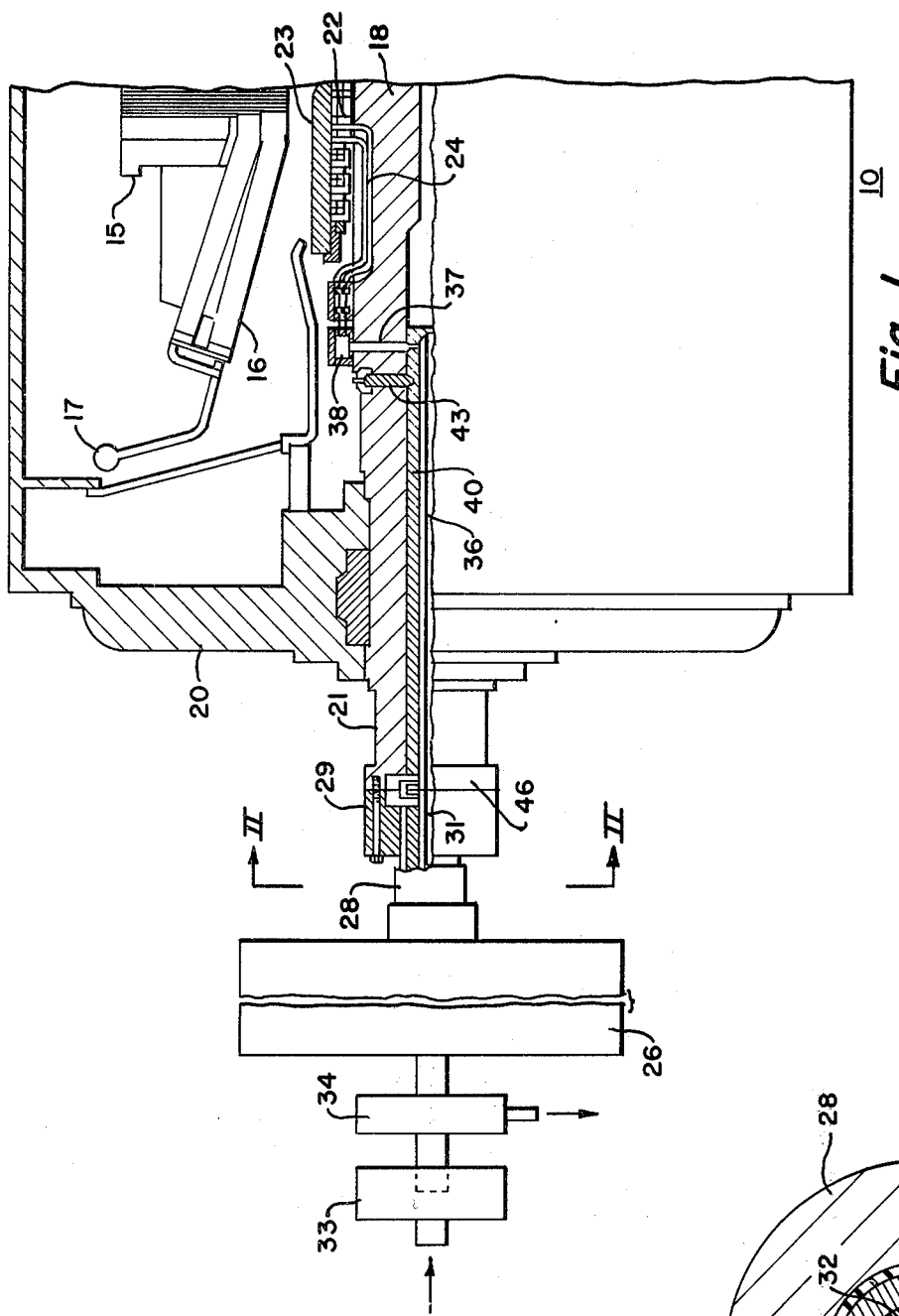
FIG. 1 is a view, partly in longitudinal section and partly in elevation, of a turbine generator unit embodying the invention.

The invention is shown in the drawings embodied in a large turbine generator unit of typical construction, although the invention may, of course, be applied to any desired type of dynamoelectric machine.

Referring first to FIG. 1, there is shown a generating unit including a large generator 10 which has a stator core 12 supported in a substantially gas-tight outer housing 14. The core 12 is of the usual laminated construction having a generally cylindrical bore therethrough, and the laminations are clamped between suitable end plates 15 in the usual manner. The stator core 12 has longitudinal slots in its inner periphery for the reception of a stator winding 16 which may be of any suitable or usual type. The winding 16 is shown as being a liquid-cooled winding and circular inlet and discharge manifolds 17 are provided at opposite ends of the machine for circulating a coolant liquid such as water through the coils of the stator winding. The housing 14 is filled with a coolant gas, preferably hydrogen, which is circulated through the interior of the housing in the usual manner, and suitable baffling of any desired type may be provided in the housing to direct the flow of gas therein. The machine has a rotor 18 which is disposed in the bore of the stator core 12 and supported in end brackets 20 at each end of the housing 14 in bearing assemblies of any desired type which may include gland seals to prevent leakage of gas from the housing.

The rotor 18 may be of the type disclosed in the above-mentioned Fidei et al application, or it may be any desired type of rotor adapted for cooling by circulation of a liquid coolant through passages in the winding. As more fully disclosed in said application, the rotor 18 has a shaft portion 21 which may be integral with the body of the rotor. A rotor winding, generally indicated at 22, is disposed in slots in the body portion of the rotor to constitute the field winding of the generator and has end portions extending beyond the body of the rotor and supported against rotational forces by the usual heavy retaining rings 23. The winding 22 may have passages or other suitable ducts extending through the individual winding conductors for passage of a coolant liquid, such as water, which is supplied to the conductors through tubes or hydraulic connectors 24 of any suitable type. The coolant may flow through the conductors in any desired flow pattern and may be discharged either at the opposite end of the rotor or, in the preferred embodiment described herein, it may be discharged at the same end of the machine at which it enters.

Figure 2:
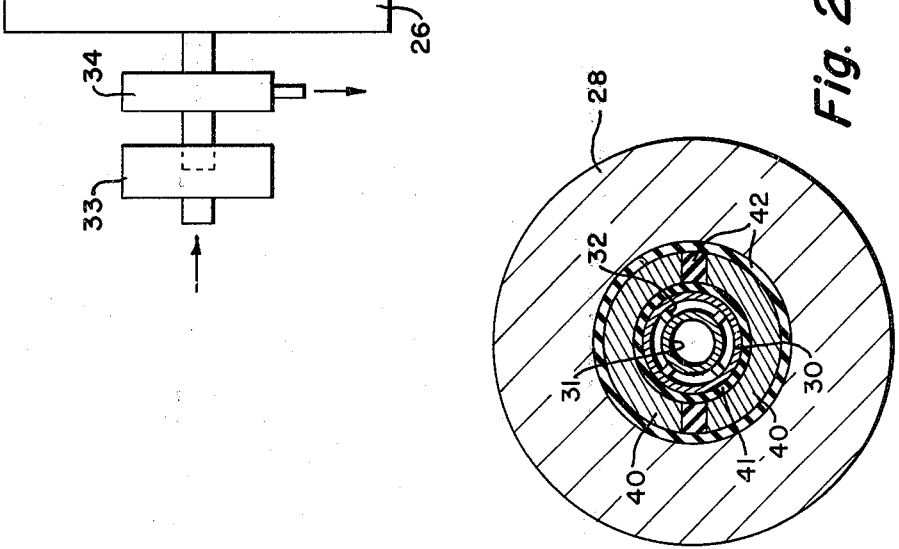
FIG. 2 is an enlarged transverse sectional view of the exciter shaft substantially on the line II—II of FIG. 1.

The generator unit also includes an exciter 26 which provides field excitation for the generator 10. The exciter may be of the brushless type, or it may be of any other suitable type capable of providing the required direct current excitation to the winding 22, and has not been shown in detail since it is not in itself a part of the present invention. The exciter 26 has a shaft 28 which is coupled to the rotor shaft 21 of the generator 10 by a coupling 29 to be driven thereby. The exciter shaft 28 has the usual central bore extending therethrough and the coolant water is introduced into the machine and discharged therefrom through this shaft bore. For this purpose, two concentric water tubes 30 and 31 are disposed in the exciter shaft bore. The tubes 30 and 31 are arranged coaxially, as shown in FIG. 2, the tube 31 providing a central passage on the axis of the shaft which is preferably utilized for entrance of water, and the tubes 30 and 31 forming an annular passage between them which is utilized for discharge of the water. Spaced axial fins 32 may be provided on the central tube 31 to properly space and position the tubes with respect to each other.

Water is introduced into the free end of the tube 31 through a stationary housing 33 provided with sealing means of any suitable type. The water circulates through the rotor winding and, in the preferred embodiment shown, returns through the annular passage between the tubes 30 and 31 and is discharged radially into a stationary chamber 34 encircling the shaft, from which the water can be drained for recirculation. The chambers 33 and 34 are provided with suitable seals capable of containing relatively large quantities of water at high pressure and high velocity. A preferred type of sealing means is shown, for example, in a patent to Heller et al U.S. Pat. No. 3,733,501, assigned to the assignee of the present invention although any suitable type of seal could be used.

Water tubes 35 and 36 are provided in the central bore of the generator shaft 21 and correspond to the tubes 30 and 31, respectively. The tubes 35 and 36 are of the same diameters as their corresponding tubes and are disposed concentrically on the axis of the shaft 21 in longitudinal alignment with the tubes 30 and 31. The water tubes 30, 31, 35 and 36 may be made of any suitable corrosion resistant material but are preferably made of stainless steel to withstand the corrosive effects of the coolant water. As more fully disclosed in the above-mentioned copending application, water entering the generator through the tubes 31 and 36 flows through radial passages 37 in the rotor 18 to a distribution chamber 38 from which it passes through insulating connectors to the tubes 24 for circulation through the winding. Returning coolant water flows through similar radial passages 37 to the annular passage between the coolant water tubes, and through the generator and exciter shafts for discharge.

The electrical leads 40 which carry the excitation current from the exciter 26 to the generator field winding 22 are also disposed in the shaft above. The leads 40 in both the exciter and generator shafts are made in the form of semi-tubular members, that is, elongated members having semicylindrical surfaces so that each lead is essentially half of a tube. The outer water tube in each shaft is wrapped with insulation 41 and the leads 40 are insulated from the shaft and from each other by suitable insulation 42. The leads thus fit into the shaft bores with adequate cross-sectional area for the high generator field current, and enclose the water tubes which provide a substantial cooling effect. The leads 40 are energized from the exciter 26 in the usual manner that is, by radial leads (not shown) extending through the exciter shaft 28 and into the leads 40. Connection from the leads 40 in the generator shaft to the field winding 22 is made by means of radial leads 43 which extend through the shaft into the conductors 40. The leads 43 are connected to the rotor winding 22 in any suitable manner.

As previously discussed, it is necessary to make water-tight joints between the corresponding water tubes in the two shafts and to make the necessary electrical connections between the conductors 40 in the respective shafts, as well as a mechanical coupling between the shafts. This may be done in accordance with the present invention in the manner illustrated in FIGS. 3 and 4. The central water tubes 31 and 36 are connected by means of a sleeve member 45 secured in an annular recess at the end of the tubes and fitting snugly in a corresponding recess at the end of the other tube with a sliding engagement. This mechanically connects the two tubes and provides a reasonably good seal for water flowing through the central tubes 31 and 36. If a small amount of leakage occurs through this seal, however, it is of little importance since the water merely escapes into the annular discharge passage between the tubes 30 and 31 and is carried out with the discharged coolant. Since the sleeve 45 is slidable on at least one of the tubes, this type of connection permits some relative axial movement between them to allow for thermal expansion and contraction.

The outer tubes 30 and 35 must be joined together with a substantially water-tight seal within the mechanical coupling between the shafts 21 and 28. The coupling itself may be formed by a coupling flange 46 in which the shaft 21 terminates and the coupling member 29 mounted on the exciter shaft 28. The coupling members 46 and 29 have abutting radial surfaces and are joined together in any suitable or desired manner, as by coupling bolts 48. In accordance with the present invention, the exciter 26 and generator 10 can be brought into their proper relative positions with their shafts in the final coupling position and properly aligned, and the connections between the water tubes and the conductors in the respective shafts can then be made without requiring any further movement of the shafts of either of the machines. This can be done either before or after the shaft coupling is completed.

In the embodiment of the invention shown in FIGS. 3 and 4, the tube 35 in the generator shaft terminates in a radial flange 50 which is preferably splined or threaded on the end of the tube 35 with a sealing connection, so as to be removable therefrom if necessary. The flange 50 is received in an annular recess 51 in the coupling flange 46 of the generator shaft and has a radial surface substantially in the plane of the surface of the flange 46. The tube 30 in the exciter shaft terminates in a generally similar flange 52 which may be either integral with the tube 30 or removable, as shown, and which has a radial surface adapted to abut the surface of the flange 50 substantially in the plane of the engaging surface of the coupling members 29 and 46. Sealing means, such as O-rings 53, are placed between the abutting surfaces of the flanges 50 and 52 to form a liquid-tight seal when sufficient axial clamping pressure is applied. The flange 50 has an annular surface 54 which engages the inner surface of the recess 51 to locate and position the flange 50 and to support it against the axial clamping pressure.

Clamping pressure is applied by a plurality of lugs 55 having surfaces engaging the flange 52 as shown. The lugs 55 are disposed within a recess in the coupling member 29, any suitable number of lugs being utilized. As shown in the drawing, there are eight lugs 55 disposed four on each side of the vertical center line, so as to leave room at the top and bottom for the electrical connections described below. Each of the clamping lugs 55 has an outer surface 57 which engages the face of the coupling flange 46 so that the lug can pivot in the axial direction, a recess 58 being provided in the flange 46 for each lug to permit such movement. A threaded actuating member 59 for each clamping lug passes through aligned openings in the coupling member 29 and the lug and is threaded into the coupling flange 46. The head 60 of each member 59 is formed for engagement by a wrench or other suitable tool, and when the member 59 is rotated, it draws a collar 61 into engagement with the lug 55 to cause the lug 55 to pivot on its surface 57 and apply axial clamping force to the flange 52. The necessary seal between the water tubes 30 and 35 is thus made by clamping means actuated from the outside of the coupling.

In the construction shown in FIG. 3, the flange 50 is fixed in axial position by engagement of the surface 54 with the coupling flange 46. Since the other end of the tube 35 is also fixed in position by its connection to the radial water passages 37, it is necessary to provide for differential thermal expansion between the tube and the shaft 21. This may be done by interposing in the tube 35 as bellows (not shown) capable of absorbing the expansion, as disclosed in Heller et al U.S. Pat. No. 3,740,595, assigned to the assignee of the present invention. In some cases, it may be desirable to provide for differential expansion without the use of a bellows by anchoring the tube 35 only at the point where it is connected to the radial water passages, the complete assembly of tubes 30 and 35 being permitted to move axially within the bores of the respective shafts. When it is desired to do this, the structure shown in FIG. 5 may be utilized for clamping the flanges of the tubes. As there shown, a second series of lugs 64 is provided corresponding to the lugs 55. The lugs 55 and 64 of each pair having engaging surfaces 65 at their upper ends, and have surfaces at the lower ends engaging radial surfaces of the flanges 52 and 50, respectively. In this arrangement, the flange 50 is spaced from the coupling flange 46 as shown and each lug 64 has a recess 66 engaging a shoulder 67 extending axially from the coupling flange. The threaded actuating member 59 in this case passes through an opening in the lug 55 as before and is threaded into the lug 64 at 68, the recess 66 being at one side of the member 59. Thus, when the member 59 is tightened, the two lugs 64 and 55 are forced together to apply axial clamping pressure between the flanges 50 and 52. The pairs of lugs 55 and 64 are positioned radially by the shoulders 67 and recesses 66 which provide sufficient clearance to allow the entire assembly to move axially sufficiently to permit differential thermal expansion.

Electrical connection between corresponding conductors 40 in the two shafts is also made within the coupling in the manner shown in FIGS. 3 and 4. The conductors 40 are semi-tubular copper members and each conductor terminates in a flange having a radial surface somewhat short of the end of the water tube which it encircles. Each conductor 40 has a radial connector 70 attached to its end surface. The connectors 70 are preferably made of laminated copper to provide flexibility with high current-carrying capacity, and each connector 70 terminates in an arcuate portion 71 which engages the end face of the conductor 40 and is secured to it by bolts 72. The connectors 70 extending radially outward into recesses 73 in the coupling members and have copper contact blocks 74 brazed or otherwise attached to them. The connectors 70 may be insulated by insulation members 75 in the recesses 73 or in any other desired manner. A slot 76 is provided in the exciter coupling member 29 in alignment with the outer ends of the connectors 70, and bolts 77 extend through the contact block 74 on the exciter side and are threaded into the other contact block. The bolts 77 are positioned to be accessible through the slot 76, any suitable number of bolts being used, although three bolts are shown. It will be seen that when the coupling members are properly positioned, the contact blocks 74 on each side are disposed to engage each other, and the bolts 77 can then be tightened by inserting a suitable tool through the slots 76 to tighten the bolts and complete the electrical connection.

Figure 6:
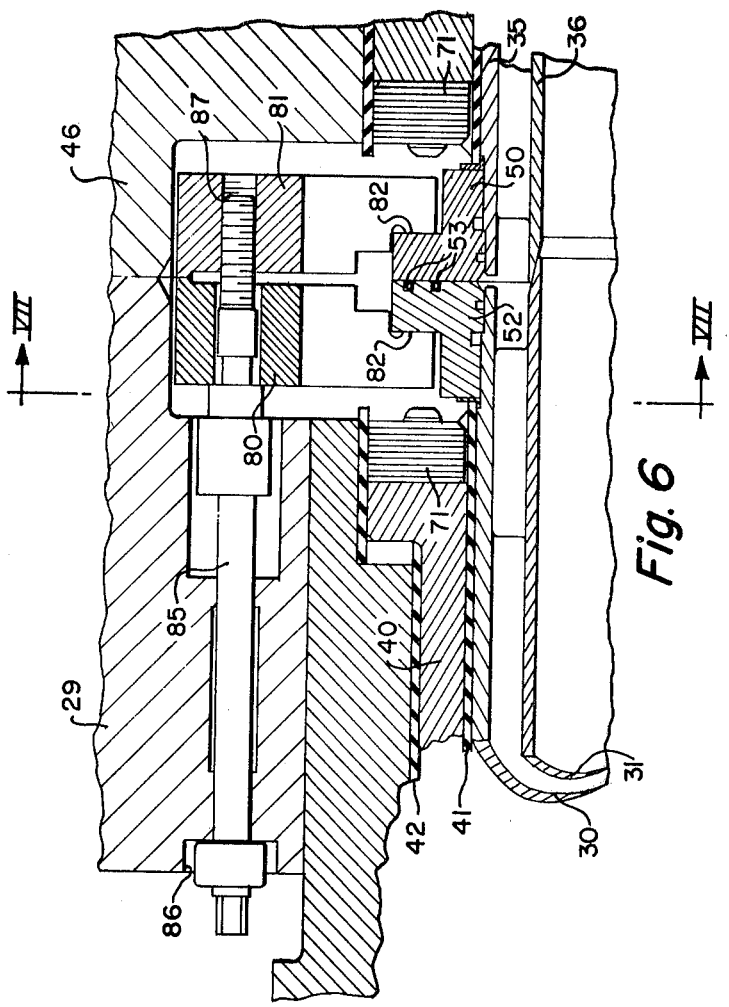
FIG. 6 is a longitudinal sectional view on the line VI—VI of FIG. 7 illustrating another embodiment of the invention.
Figure 7:
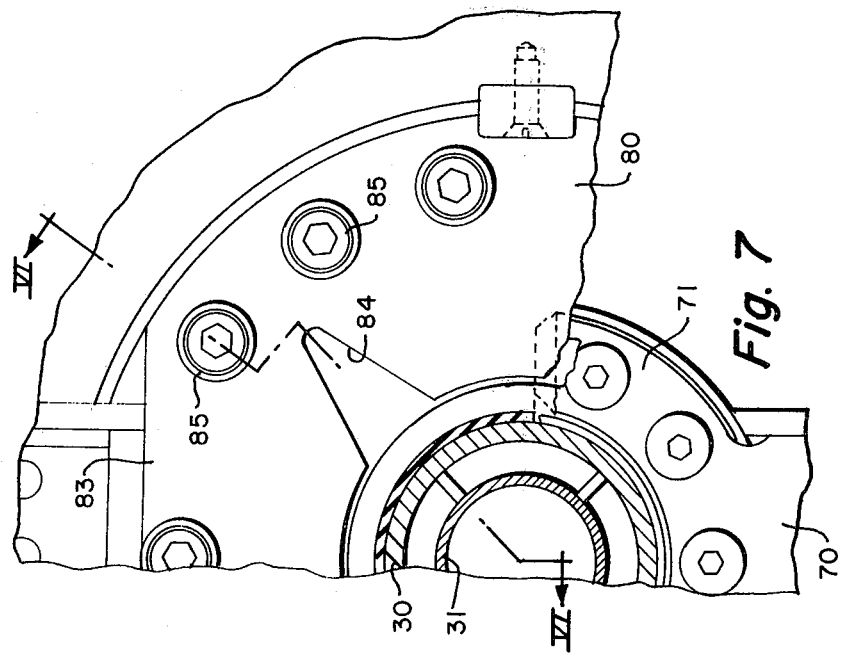
FIG. 7 is a transverse sectional view on the line VII—VII of FIG. 6.

An alternative means for applying clamping pressure to the flanges 50 and 52 is shown in FIGS. 6 and 7. As there shown, the lugs 55 and 64 of FIG. 5 are replaced by clamping rings 80 and 81, respectively. Each of the rings 80 and 81 has clamping surfaces 82 engaging the radial surface of the flange 50 or 52. The rings 80 and 81 have flattened peripheral portions 83 in diametrically-opposed positions to clear the electrical connections which are made in the manner described above. The rings also have cut-out portions 85 between the engaging surfaces 82 to permit some flexibility. Each ring has a plurality of actuating members 85 which extend through axial openings 86 in the coupling member 29 and which are threaded into the ring 81 as indicated at 87. It will be seen that when the actuating members 85 are tightened through the opening 86, the rings 80 and 81 are drawn together and apply the desired axial clamping pressure to the flanges 50 and 52. The electrical connections between the conductors 40 in the two shafts are made in the same manner as described above and shown in FIGS. 3 and 4.

Figure 8:
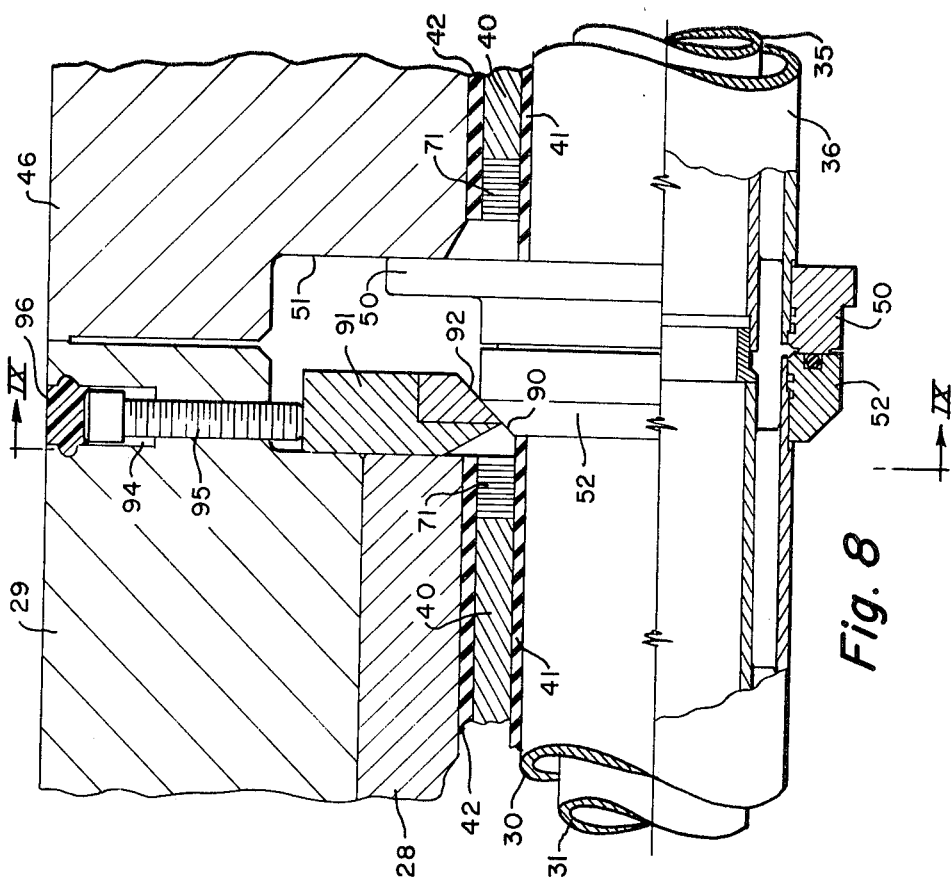
FIG. 8 is a longitudinal sectional view on the line VIII—VIII of FIG. 9, showing still another embodiment of the invention.
Figure 9:
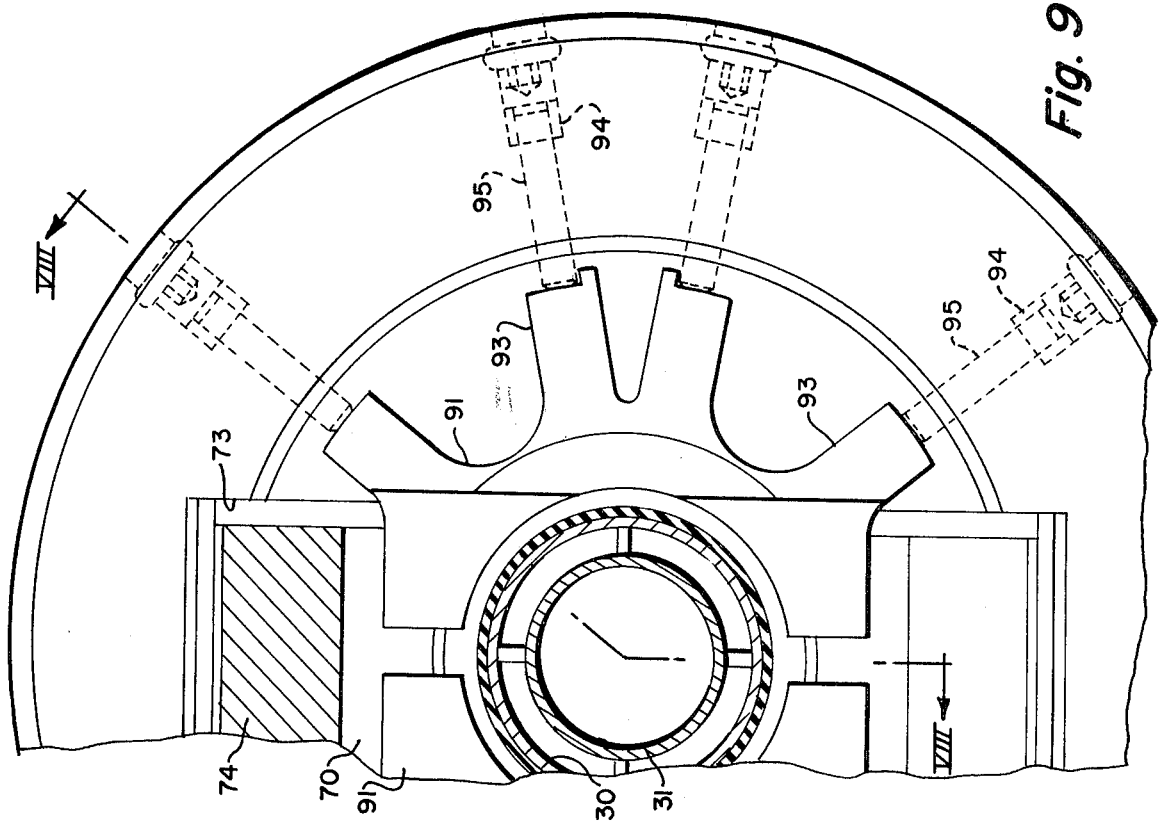
FIG. 9 is a transverse sectional view substantially on the line IX—IX of FIG. 8.

Still another alternative construction for the joint between the water tubes is shown in FIGS. 8 and 9. As there shown, the flange 50 abuts the internal surface of the recess 51 in the coupling flange 46 in the manner previously described so that the flange 50 is fixed in axial position, differential expansion being provided for by means of a bellows or otherwise as previously described. The flange 52 has a sloped or conical surface 90 on the side away from the radial sealing surface. Clamping pressure between the flanges is applied by means of two pressure plates 91 disposed one on each side of the vertical center line as shown in FIG. 9. Each of the pressure plates has an inclined surface 92 engaging the conical surface 90 of the flange 52. Each pressure plate 91 has a plurality of radial extensions 93 in alignment with radial holes 94 extending through the coupling member 29 in the spaces between the coupling bolts. A threaded actuating member 95 extends through each of the holes 94 and is threaded in the coupling so that the actuating member 95 can be moved into engagement with the corresponding radial extension 93 to apply radial pressure to the pressure plate 91. This radial pressure results in the inclined surface 92 applying an axial force through the surface 90 to the flange 52 to apply clamping pressure between the flanges. After the pressure plates have been properly actuated into position to form the connection and seal between the water tubes, the outer ends of the openings 94 may be closed with a suitable resin 96, if desired, to protect them from accidental movement. The electrical connections between the conductors 40 are made in the manner previously described.

It will be seen that in the embodiment shown in FIG. 8 the flange 50 is anchored in position as in FIG. 3 so that provision must be made for differential expansion by some means such as a bellows. If desired, the tubes 30 and 36 could be permitted to move axially in the bore as discussed above in connection with FIG. 5. If this is done, the flange 50 would be spaced from the surface of the recess 51 in the coupling flange and would be provided with a conical surface similar to the surface 90. The pressure plates 91 could then be provided with an annular groove or recess having opposed surfaces to engage the corresponding conical surfaces of the flanges. When subjected to radial force in the manner described, the pressure plates would then apply clamping pressures to the flanges in a manner generally similar to that of FIG. 5.

It will now be apparent that means have been provided for making the necessary water-tight joints between water tubes, and the necessary electrical connections between conductors disposed in the bores of the exciter shaft and of the generator shaft. The arrangement is such that the shafts can be disposed in their final coupling position and properly aligned, and the necessary clamping pressure for making the water-tight connections between the tubes can be applied by actuating the clamping members from the outside of the coupling without disturbing the shaft position, or requiring any movement other than the slight possible movement of the tubes themselves to bring them into clamping position. The electrical connections are similarly made by bolts accessible from the outside of the coupling so that these connections can also be made without disturbing the shafts. The water tube joints and the electrical connections are completely enclosed within the coupling members which mechanically couple the shafts together, and the coupling can be completed by means of the usual bolts or other coupling means either before or after the joints and connections within the coupling have been completed. Thus, a very effective but relatively simple means is provided for making the necessary water and electrical connections within the mechanical shaft coupling.

We claim as our invention:

1. An electric generating unit comprising:
a main generator and an exciter therefor having axially aligned shafts, each of said shafts having a central bore extending axially therethrough;
at least one tube disposed in each shaft bore for passage of a coolant liquid, two insulated conductors disposed in each bore, the tubes and conductors of the generator shaft and of the exciter shaft being axially aligned, said tubes terminating in abutting radial flanges adjacent the abutting ends of the shafts;
means for sealing disposed between said flanges;
clamping means external to said flanges for clamping said radial flanges together to form a liquid-tight seal, said clamping means having surfaces engaging at least one of said radial flanges, actuation of said flanges applying an axial force to said flanges to clamp them together;
means for making electrical connections between corresponding conductors of the generator and exciter shafts;
coupling means for mechanically coupling together the generator and exciter shafts, said coupling means enclosing said clamping means and said electrical connections, said coupling means having openings therein; and,
means for actuating said clamping means, said actuating means being operable in cooperative association with said openings in said coupling means to engage said clamping means for actuation thereof from outside said coupling means.

2. The combination of claim 1 wherein said clamping means comprises a plurality of generally radially disposed lugs pivotally supported in the coupling; and,
said actuating means being operable through said openings in the coupling for actuating the lugs to apply clamping pressure to the flanges.

3. The combination of claim 2 in which said openings extend axially through the coupling, and wherein said actuating means include a threaded member extending through each of said openings and engaging one of said lugs for actuation thereof.

4. The combination of claim 1 wherein said clamping means comprises a pair of ring members encircling said tubes and engaging surfaces of said flanges opposite to the abuting surfaces; and,
said actuating means being operable through said openings in the coupling for drawing said ring members toward each other to apply clamping pressure to the flanges.

5. The combination of claim 4 in which said openings extend axially through the coupling, and wherein said actuating means include threaded members accessible through the openings and engaging said rings for drawing them toward each other.

6. The combination of claim 1 wherein at least one of said flanges has a surface inclined to the axis of the tubes, a plurality of clamping members having surfaces engaging said surface of said flange;
said coupling having generally radial openings extending through the coupling; and,
said actuating means including threaded members operable through said openings for applying radial pressure to the clamping members.

7. The electric generating unit of claim 1, wherein said coupling means has additional openings therein for access to said means for making electrical connections.

* * * * *